US010880808B1

(12) United States Patent
Peng

(10) Patent No.: US 10,880,808 B1
(45) Date of Patent: Dec. 29, 2020

(54) WIRELESS BACKHAUL NETWORK FOR DYNAMICALLY CONFIGURING WIRELESS BACKHAUL PATH

(71) Applicant: Realtek Singapore Pte. Ltd., Singapore (SG)

(72) Inventor: Haoxiang Peng, Singapore (SG)

(73) Assignee: REALTEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/454,496

(22) Filed: Jun. 27, 2019

(51) Int. Cl.
*H04W 4/00* (2018.01)
*H04W 40/12* (2009.01)
*H04W 88/08* (2009.01)

(52) U.S. Cl.
CPC ............ *H04W 40/12* (2013.01); *H04W 88/08* (2013.01)

(58) Field of Classification Search
CPC ... H04W 84/042; H04W 88/06; H04W 88/02; H04W 88/16; H04W 76/14; H04W 40/12; H04W 88/08
See application file for complete search history.

(56) References Cited

U.S. PATENT DOCUMENTS

| | | | | |
|---|---|---|---|---|
| 2007/0217373 A1* | 9/2007 | Kotzin | .................. | H04L 1/0631 370/338 |
| 2009/0245264 A1* | 10/2009 | Winner | ............... | H04L 12/4641 370/401 |
| 2010/0303092 A1* | 12/2010 | Chinnaswamy | .... | H04L 12/2859 370/465 |
| 2012/0106437 A1* | 5/2012 | Seo | ..................... | H04B 7/15542 370/315 |
| 2015/0281980 A1* | 10/2015 | Zhou | ................. | H04W 28/0268 370/254 |
| 2016/0007273 A1* | 1/2016 | Farid | ..................... | H04W 16/02 370/329 |
| 2016/0277284 A1* | 9/2016 | Callard | ................. | H04L 1/0075 |
| 2017/0064731 A1* | 3/2017 | Wang | ................ | H04W 72/1263 |
| 2018/0124677 A1* | 5/2018 | He | ........................ | H04W 40/12 |
| 2019/0342795 A1* | 11/2019 | McFarland | ........... | H04W 16/10 |

\* cited by examiner

*Primary Examiner* — Atique Ahmed
(74) *Attorney, Agent, or Firm* — Birch, Stewart, Kolasch & Birch, LLP

(57) ABSTRACT

A wireless backhaul network for bridging a neighboring network and a network device includes: a plurality of access points; a root node utilized for communicating with the neighboring network and at least a portion of the access points; a bridge node utilized for communicating with the network device and at least a portion of the access points; and a controller node utilized for communicating with the root node, the bridge node, and at least a portion of the access points. The controller node selects a first subset of the access points as backhaul nodes to form a first wireless backhaul path in a first period, and dynamically selects a different second subset of the access points as new backhaul nodes to form a second wireless backhaul path in a second period, so as to replace the first wireless backhaul path.

15 Claims, 11 Drawing Sheets

WIRELESS BACKHAUL NETWORK FOR DYNAMICALLY CONFIGURING WIRELESS BACKHAUL PATH

BACKGROUND

The disclosure generally relates to a wireless backhaul network and, more particularly, to a wireless backhaul network for dynamically configuring the wireless backhaul path thereof.

A wireless backhaul network is a wireless communication infrastructure responsible for transporting communication data from a neighboring network or a network device (such as a remote IP camera or other network appliance) to the backbone or another neighboring network.

In the conventional wireless backhaul network, the wireless backhaul path is randomly selected and stay fixed after it is established. However, the radio environment of the wireless backhaul network often changes with time due to interferences, noises, shielding effect caused by buildings/moving objects, or other reasons. Once the radio environment changes, the signal quality/throughput of the wireless backhaul path may be adversely affected, thereby degrading the performance of the wireless backhaul network.

SUMMARY

An example embodiment of a wireless backhaul network for bridging a neighboring network and a network device is disclosed, comprising: a plurality of access points; a root node, comprising: a first wireless communication circuit, arranged to operably communicate with at least a portion of the plurality of access points through wireless transmission approaches; a first network interface circuit, arranged to operably communicate with the neighboring network through a first communication link; and a first control circuit, coupled with the first wireless communication circuit and the first network interface circuit, and arranged to operably control the first wireless communication circuit and the first network interface circuit; a bridge node, comprising: a second wireless communication circuit, arranged to operably communicate with at least a portion of the plurality of access points through wireless transmission approaches; a second network interface circuit, arranged to operably communicate with the network device through a second communication link; and a second control circuit, coupled with the second wireless communication circuit and the second network interface circuit, and arranged to operably control the second wireless communication circuit and the second network interface circuit; and a controller node, comprising: a third wireless communication circuit, arranged to operably communicate with the root node, the bridge node, and at least a portion of the plurality of access points through wireless transmission approaches; and a third control circuit, coupled with the third wireless communication circuit and arranged to operably select a first subset of the plurality of access points as backhaul nodes to form a first wireless backhaul path in a first period; wherein the third control circuit is further arranged to dynamically select a different second subset of the plurality of access points as new backhaul nodes to form a second wireless backhaul path in a second period, so as to replace the first wireless backhaul path.

Another example embodiment of a wireless backhaul network for bridging a neighboring network and a network device is disclosed, comprising: a plurality of access points; a controller node, comprising: a third wireless communication circuit, arranged to operably communicate with at least a portion of the plurality of access points through wireless transmission approaches; a first network interface circuit, arranged to operably communicate with the neighboring network through a first communication link; and a third control circuit, coupled with the third wireless communication circuit and the first network interface circuit, and arranged to operably select a first subset of the plurality of access points as backhaul nodes to form a first wireless backhaul path in a first period; and a bridge node, comprising: a second wireless communication circuit, arranged to operably communicate with at least a portion of the plurality of access points through wireless transmission approaches; a second network interface circuit, arranged to operably communicate with the network device through a second communication link; and a second control circuit, coupled with the second wireless communication circuit and the second network interface circuit, and arranged to operably control the second wireless communication circuit and the second network interface circuit; wherein the third control circuit is further arranged to operably communicate with the bridge node, and to dynamically select a different second subset of the plurality of access points as new backhaul nodes to form a second wireless backhaul path in a second period, so as to replace the first wireless backhaul path.

Another example embodiment of a wireless backhaul network for bridging a neighboring network and a network device is disclosed, comprising: a plurality of access points; a root node, comprising: a first wireless communication circuit, arranged to operably communicate with at least a portion of the plurality of access points through wireless transmission approaches; a first network interface circuit, arranged to operably communicate with the neighboring network through a first communication link; and a first control circuit, coupled with the first wireless communication circuit and the first network interface circuit, and arranged to operably control the first wireless communication circuit and the first network interface circuit; and a controller node, comprising: a third wireless communication circuit, arranged to operably communicate with the root node and at least a portion of the plurality of access points through wireless transmission approaches; a second network interface circuit, arranged to operably communicate with the network device through a second communication link; and a third control circuit, coupled with the third wireless communication circuit and the second network interface circuit, and arranged to operably select a first subset of the plurality of access points as backhaul nodes to form a first wireless backhaul path in a first period; wherein the third control circuit is further arranged to dynamically select a different second subset of the plurality of access points as new backhaul nodes to form a second wireless backhaul path in a second period, so as to replace the first wireless backhaul path.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
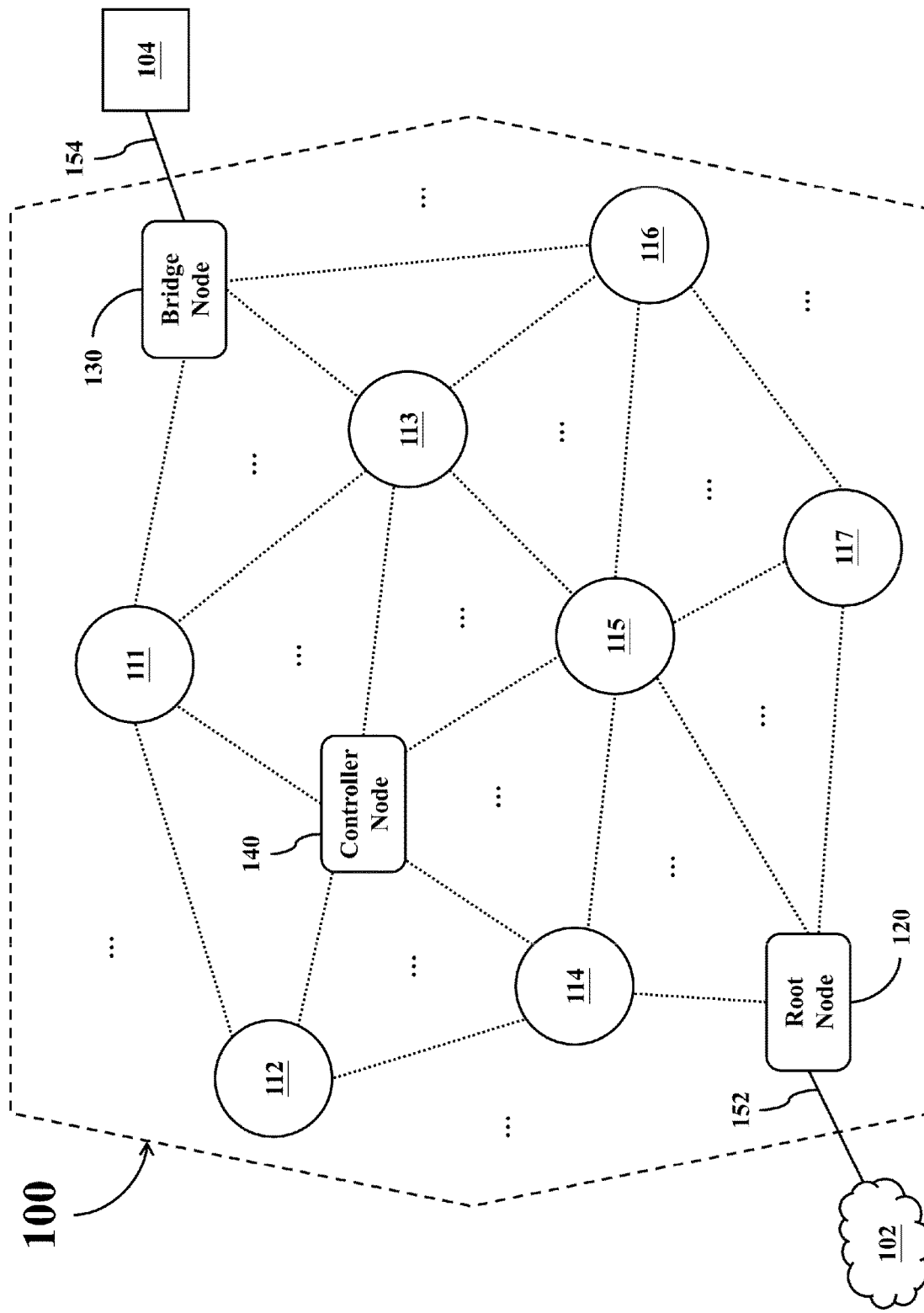
FIG. 1 shows a simplified functional block diagram of a wireless backhaul network according to a first embodiment of the present disclosure.
Figure 2:
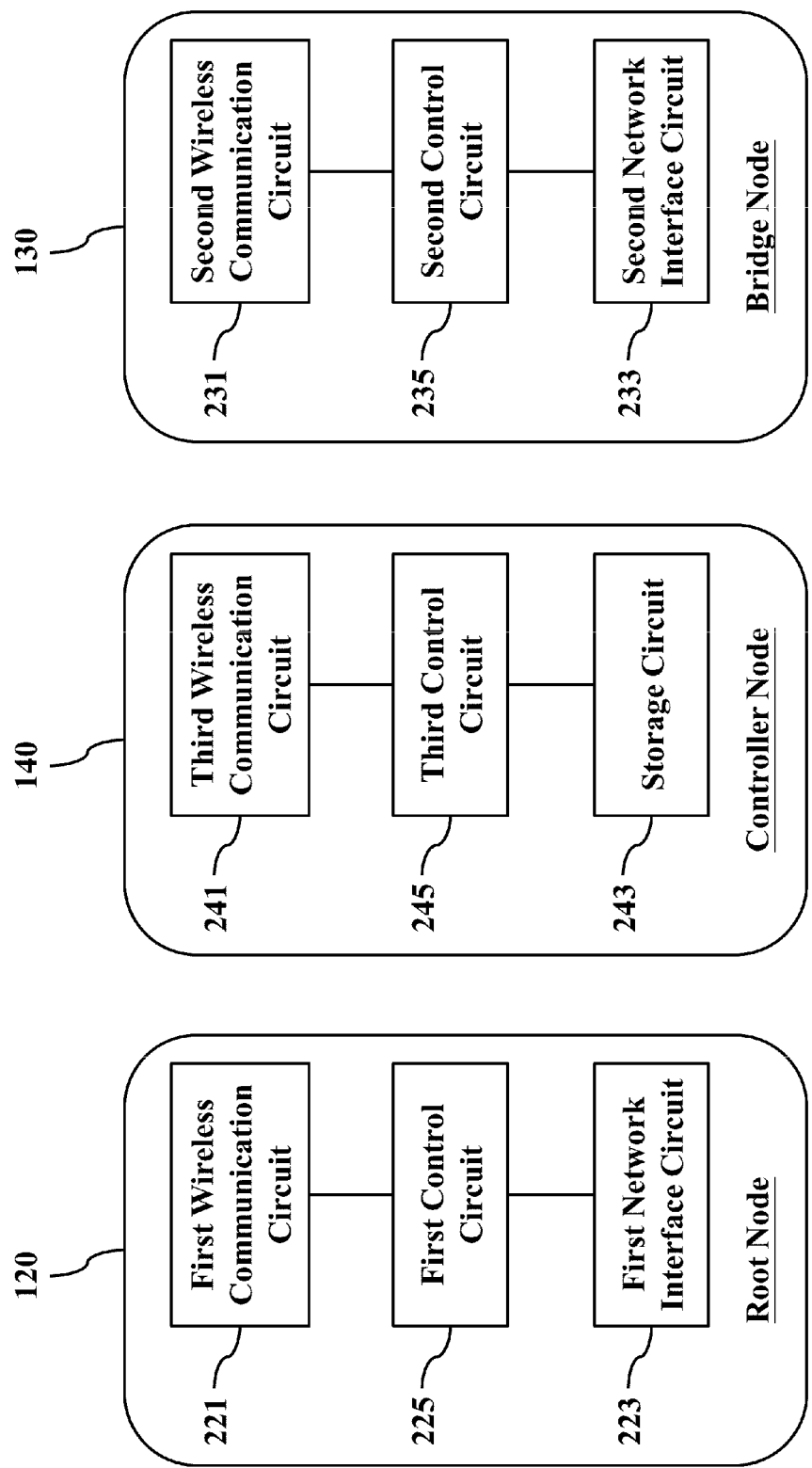
FIG. 2 shows simplified functional block diagrams of a root node, a bridge node, and a controller node of the wireless backhaul network according to a first embodiment of the present disclosure.

FIG. 1 shows a simplified functional block diagram of a wireless backhaul network 100 according to a first embodiment of the present disclosure. The wireless backhaul network 100 bridges a neighboring network 102 and a network device 104. The wireless backhaul network 100 is utilized for providing a wireless backhaul path from the network device 104 to the neighboring network 102, so that data can be transmitted from the network device 104 to the neighboring network 102 through the wireless backhaul path.

In practice, the neighboring network 102 may be the backbone of the communication infrastructure or an intermediate network connecting to the backbone. The network device 104 may be a standalone network appliance (such as a remote IP camera, a network monitoring device, a security surveillance system, etc.) or the gateway device/root node of another neighboring network.

As shown in FIG. 1, the wireless backhaul network 100 of this embodiment comprises a plurality of access points (e.g., the exemplary access points 111-117 shown in FIG. 1), a root node 120, a bridge node 130, and a controller node 140.

The root node 120 comprises a first wireless communication circuit 221, a first network interface circuit 223, and a first control circuit 225. The first wireless communication circuit 221 is arranged to operably communicate with at least a portion of the plurality of access points 111-117 through wireless transmission approaches. The first network interface circuit 223 is arranged to operably communicate with the neighboring network 102 through a first communication link 152. The first control circuit 225 is coupled with the first wireless communication circuit 221 and the first network interface circuit 223, and arranged to operably control the operations of the first wireless communication circuit 221 and the first network interface circuit 223.

The bridge node 130 comprises a second wireless communication circuit 231, a second network interface circuit 233, and a second control circuit 235. The second wireless communication circuit 231 is arranged to operably communicate with at least a portion of the plurality of access points 111-117 through wireless transmission approaches. The second network interface circuit 233 is arranged to operably communicate with the network device 104 through a second communication link 154. The second control circuit 235 is coupled with the second wireless communication circuit 231 and the second network interface circuit 233, and arranged to operably control the operations of the second wireless communication circuit 231 and the second network interface circuit 233.

The controller node 140 comprises a third wireless communication circuit 241, a storage circuit 243, and a third control circuit 245. The third wireless communication circuit 241 is arranged to operably communicate with the root node 120, the bridge node 130, and at least a portion of the plurality of access points 111-117 through wireless transmission approaches. The storage circuit 243 is arranged to operably store data required for the operations of the controller node 140. The third control circuit 245 is coupled with the third wireless communication circuit 241 and the storage circuit 243, and arranged to operably dynamically configure a wireless backhaul path for the wireless backhaul network 100.

In practice, each of the communication links 152 and 154 may be realized with various data cables or wireless data connections. Each of the aforementioned wireless communication circuits 221, 231, and 241 may be realized with various transmission circuits capable of conducting wireless transmission with other devices by adopting appropriate wireless communication protocols. Each of the aforementioned network interface circuits 223 and 233 may be realized with various transmission circuits capable of conducting wireless transmission or wired communication with other devices by adopting appropriate data communication protocols. The storage circuit 243 may be realized with various volatile memories or non-volatile storage devices.

In addition, each of the control circuits 225, 235, and 245 may be realized with one or more micro-controllers, microprocessors, or other application-specific integrated circuits (ASICs) having computing and data processing capability.

Figure 3:
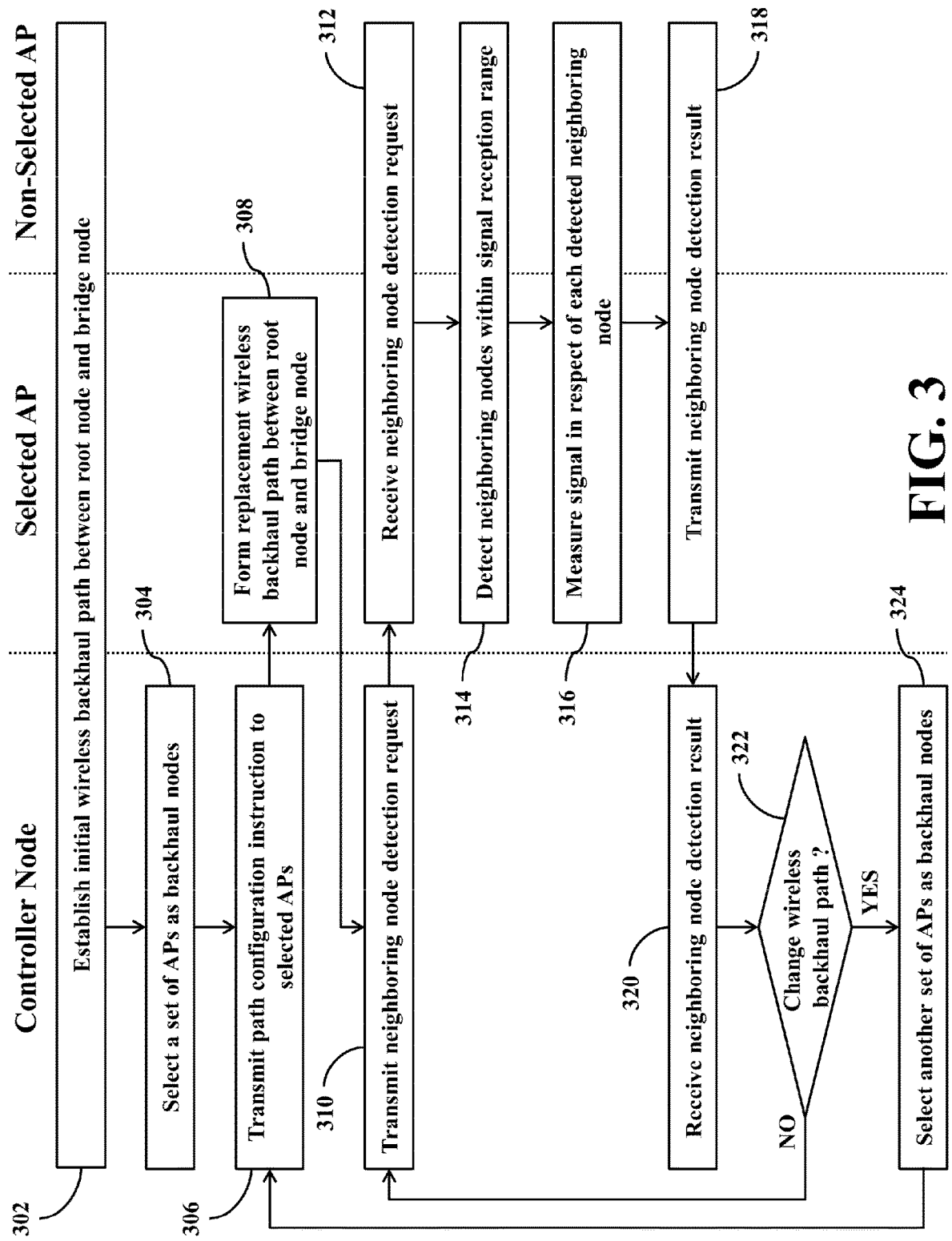
FIG. 3 shows a simplified flowchart of a method for dynamically configuring a wireless backhaul path for the wireless backhaul network of FIG. 1 according to one embodiment of the present disclosure.
Figure 4:
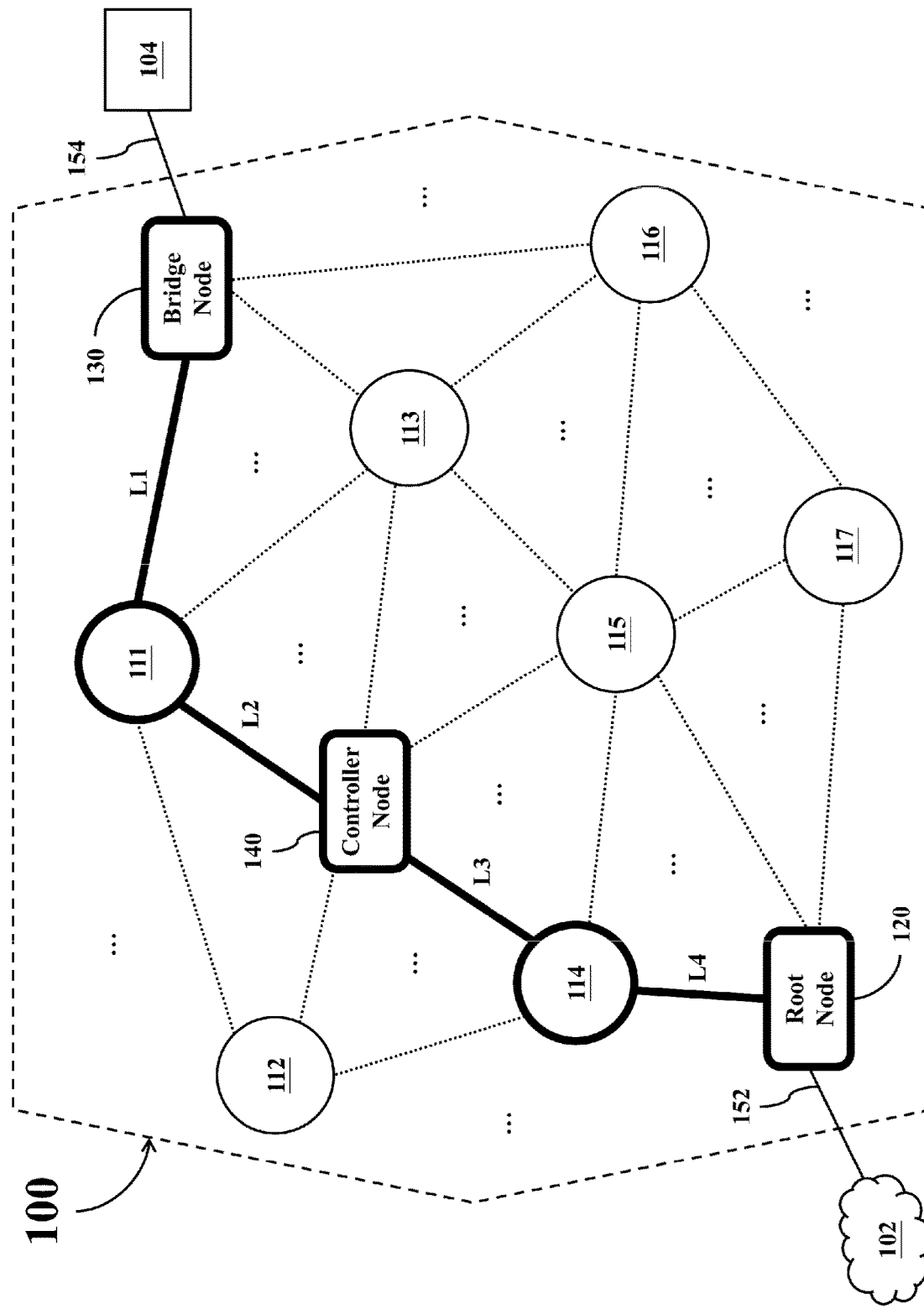
FIG. 4 and FIG. 5 show simplified schematic diagrams of wireless backhaul paths of the wireless backhaul network in different periods of time according to one embodiment of the present disclosure.
Figure 5:
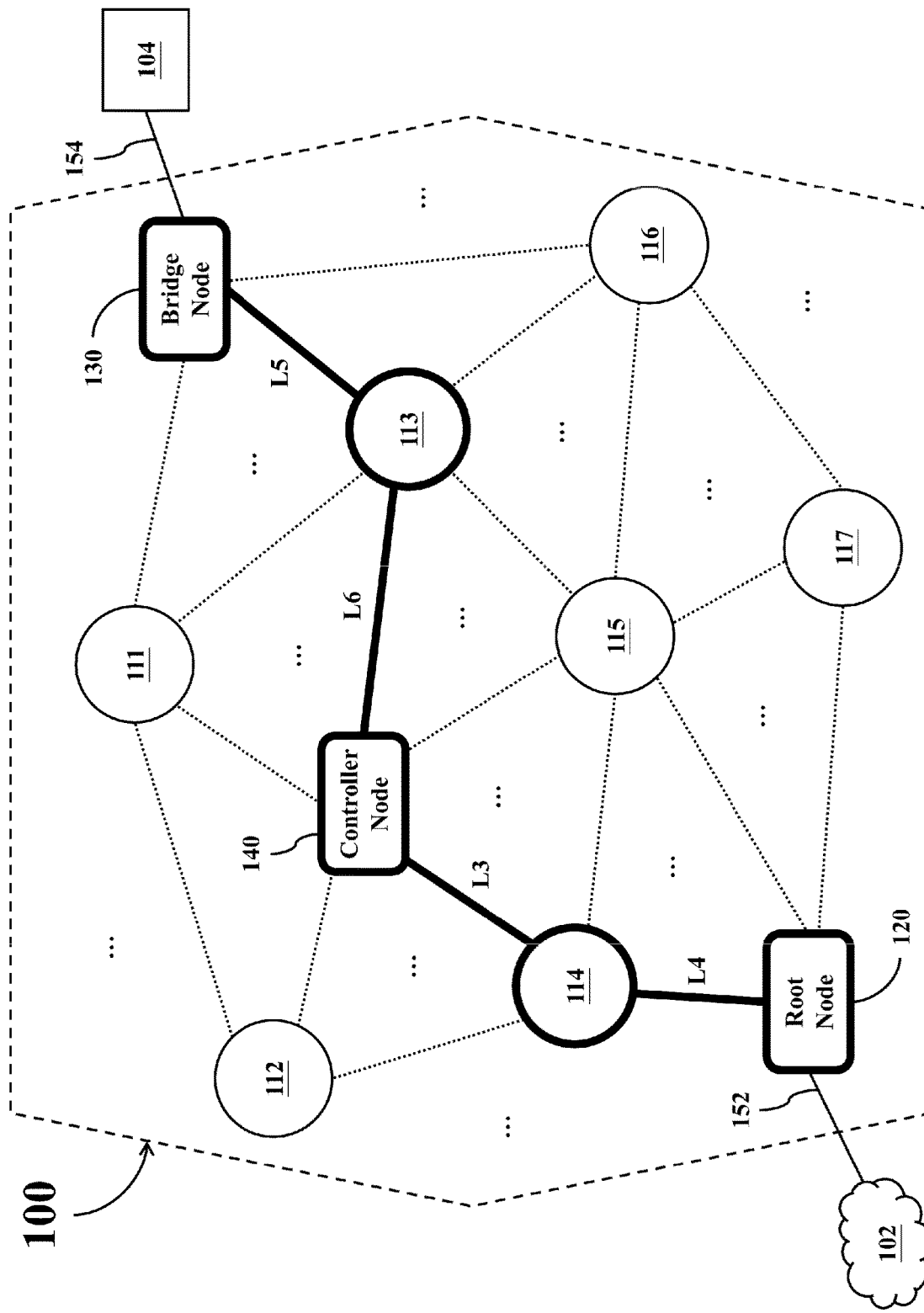

The operations of the wireless backhaul network 100 will be further described in the following by reference to FIG. 3 through FIG. 5. FIG. 3 shows a simplified flowchart of a method for dynamically configuring a wireless backhaul path for the wireless backhaul network 100 according to one embodiment of the present disclosure. FIG. 4 and FIG. 5 show simplified schematic diagrams of wireless backhaul paths of the wireless backhaul network 100 in different periods of time according to one embodiment of the present disclosure.

In FIG. 3, operations within a column under the name of a specific device are operations to be performed by the specific device. For example, operations within a column under the label "Controller Node" are operations to be performed by the controller node 140; operations within a column under the label "Selected AP" are operations to be performed by access points (APs) dynamically selected by the controller node 140; and operations within a column under the label "Non-Selected AP" are operations to be performed by other access points that are not selected by the controller node 140.

In the wireless backhaul network 100, each of the root node 120, the bridge node 130, the controller node 140, and the plurality of access points 111-117 is a network node. After the wireless backhaul network 100 is deployed, the wireless backhaul network 100 may perform the operation 302 to conduct an initialization procedure so as to establish an initialization wireless backhaul path between the root node 120 and the bridge node 130.

In one embodiment, the administrator of the wireless backhaul network 100 may manually select some nodes within the wireless backhaul network 100 as backhaul nodes, and configure those selected nodes to establish an initial wireless backhaul path between the root node 120 and the bridge node 130 in the operation 302. According to the configuration of the administrator, each node in the initial wireless backhaul path establishes wireless signal connections with two neighboring nodes and acts as a signal repeater between the two neighboring nodes.

In another embodiment, the root node 120, the bridge node 130, the controller node 140, and the plurality of access points 111-117 may automatically detect which neighboring nodes are located within their wireless signal reception range, and then adopt various appropriate existing algorithms to establish an initial wireless backhaul path between the root node 120 and the bridge node 130. That is, the initial wireless backhaul path of this embodiment can be automatically established without the involvement of the administrator of the wireless backhaul network 100.

For example, the first control circuit 225 of the root node 120 may utilize the first wireless communication circuit 221 to connect to a neighboring node within the wireless backhaul network 100 through wireless approaches, and then instructs the neighboring node to connect to another node within the wireless backhaul network 100 through wireless approaches. The above operation can be repeated to extend the wireless signal path until the wireless signal path reaches the bridge node 130. For another example, the second control circuit 235 of the bridge node 130 may utilize the second wireless communication circuit 231 to connect to a neighboring node within the wireless backhaul network 100 through wireless approaches, and then instructs the neighboring node to connect to another node within the wireless backhaul network 100 through wireless approaches. The above operation can be repeated to extend the wireless signal path until the wireless signal path reaches the root node 120.

In this embodiment, each node in the wireless signal path automatically establishes wireless signal connections with two neighboring nodes and acts as a signal repeater between the two neighboring nodes. In this way, multiple nodes within the wireless backhaul network 100 can be consecutively connected between the root node 120 and the bridge node 130 through wireless communication approaches to form an initial wireless backhaul path between the root node 120 and the bridge node 130. As a result, data can be transmitted from the network device 104 to the neighboring network 102 through the bridge node 130, the initial wireless backhaul path, and the root node 120.

In order to increase the performance of the wireless backhaul network 100, the controller node 140 dynamically changes the wireless backhaul path during the operations of the wireless backhaul network 100.

In some embodiments where the administrator/creator of the wireless backhaul network 100 does not input the actual network topology information of the wireless backhaul network 100 into the controller node 140, the controller node 140 may derive a logical topology relationship corresponding to the actual network topology of the wireless backhaul network 100 by itself.

For example, during the operations of the wireless backhaul network 100, the third control circuit 245 of the controller node 140 may request other nodes within the wireless backhaul network 100 to detect identification data (e.g., MAC address, hardware identification code, or the like) and status of their neighboring nodes and report to the controller node 140, so that the third control circuit 245 can establish a logical topology relationship among the root node 120, the bridge node 130, the controller node 140, and the plurality of access points 111-117 by adopting various existing network topology discovery approaches. The logical topology relationship established by the third control circuit 245 may not precisely represent the actual network topology of the wireless backhaul network 100, but can be used to roughly represent a concise connection relationship among the root node 120, the bridge node 130, the controller node 140, and the plurality of access points 111-117.

The third control circuit 245 may store the logical topology relationship in the storage circuit 243 for later use, and proceed with the operation 304.

In some embodiments where the administrator/creator of the wireless backhaul network 100 inputs the actual topology information of the wireless backhaul network 100 into the controller node 140, the controller node 140 may simply proceed with the operation 304 without the need for deriving the logical topology relationship among the root node 120, the bridge node 130, the controller node 140, and the plurality of access points 111-117 as described above.

Based on the actual topology information provided by the administrator/creator of the wireless backhaul network 100 or the logical topology relationship derived by the third control circuit 245, the third control circuit 245 may find that there exists other possible wireless signal paths between the root node 120 and the bridge node 130.

Accordingly, in the operation 304, the third control circuit 245 may select a set of access points located on one of other possible wireless signal paths within the wireless backhaul network 100 as backhaul nodes. For example, the third control circuit 245 may randomly select any of the possible wireless signal paths as a replacement path, and select the access points located on the replacement path as backhaul nodes.

For another example, the third control circuit 245 may select a possible wireless signal path having least quantity of nodes as the replacement path, and select the access points located on the replacement path as backhaul nodes.

For yet another example, the third control circuit 245 may randomly select any of the possible wireless signal paths passing through the controller node 140 as the replacement path, and select the access points located on the replacement path as backhaul nodes.

For yet another example, the third control circuit 245 may randomly select any of the possible wireless signal paths not passing through the controller node 140 as the replacement path, and select the access points located on the replacement path as backhaul nodes.

For yet another example, the third control circuit 245 may select a wireless signal path having least quantity of nodes from the possible wireless signal paths passing through the controller node 140 as the replacement path, and select the access points located on the replacement path as backhaul nodes.

For yet another example, the third control circuit 245 may select a wireless signal path having least quantity of nodes from the possible wireless signal paths not passing through the controller node 140 as the replacement path, and select the access points located on the replacement path as backhaul nodes.

Then, the third control circuit 245 may perform the operation 306 to utilize the third wireless communication circuit 241 to transmit a path configuration instruction to selected access points. In practice, the path configuration instruction addressed to each selected access point may provide the selected access point with the identification data (e.g., MAC address, hardware identification code, or the like) of the neighboring node to be connected by the selected access point.

In the operation 308, each of the selected access points automatically establishes wireless signal connections with two neighboring nodes on the replacement path based on the path configuration instruction transmitted from the controller node 140, and acts as a signal repeater between the two connected neighboring nodes. As a result, a replacement wireless backhaul path between the root node 120 and the bridge node 130 can be formed by those selected backhaul nodes.

As shown in FIG. 4, for example, supposing that the access points selected by the controller node 140 in the above operation 304 are the access point 111 and the access point 114. Four consecutive wireless signal connections L1, L2, L3, and L4 may collectively constitute a replacement wireless backhaul path between the root node 120 and the bridge node 130 in a first period P1. In the embodiment of FIG. 4, the controller node 140 is located on the replacement wireless backhaul path.

The wireless backhaul network 100 then replaces the initial wireless backhaul path with the replacement wireless backhaul path configured by the controller node 140.

As is well known in the art, the wireless signal environment of the wireless backhaul network 100 may change with time, and thus affect the performance of the wireless backhaul path of the wireless backhaul network 100.

Therefore, the controller node 140 may intermittently evaluate whether to change the wireless backhaul path of the wireless backhaul network 100 or not during the operations of the wireless backhaul network 100.

In the embodiment of FIG. 3, the controller node 140 performs the operation 310 after the replacement wireless backhaul path is employed by the wireless backhaul network 100 for a certain period of time.

In the operation 310, the third control circuit 245 of the controller node 140 may utilize the third wireless communication circuit 241 to transmit a neighboring node detection request to the plurality of access points 111-117, so as to request each of the plurality of access points 111-117 to detect neighboring nodes and measure wireless signal in respect of each neighboring node. The neighboring node detection request may be directly transmitted to the access points located near the controller node 140, or may be indirectly transmitted to the access points located far away from the controller node 140 through the current wireless backhaul path.

In the operation 312, each of the plurality of access points 111-117 may directly receive the neighboring node detection request from the controller node 140, or may indirectly receive the neighboring node detection request originated from the controller node 140 through the current wireless backhaul path.

In the operation 314, each of the plurality of access points 111-117 may detect which neighboring nodes are currently located within its signal reception range. For example, each access point within the wireless backhaul network 100 may detect wireless signals transmitted from nearby nodes to verify which nodes are currently located within its signal reception range.

In the operation 316, each of the plurality of access points 111-117 may measure the signal in respect of each detected neighboring node. In practice, each access point within the wireless backhaul network 100 may measure the signal quality in respect of each detected neighboring node, and utilize a variety of existing signal quality indicators (e.g., signal strength, bit error rate, byte error rate, averaged data rate, averaged throughput, quality of service, or the like) to represent the measured signal quality in respect of each detected neighboring node in the operation 316.

It can be appreciated from the foregoing descriptions that the signal quality indicator in respect of a neighboring node of a specific access point substantially represents the signal quality of the wireless signal connection between that neighboring node and the specific access point. From another aspect, each signal quality indicator generated by the access point indicates the wireless signal quality between two neighboring nodes in the wireless backhaul network 100.

For example, the signal quality indicator corresponding to the wireless signal connection between the access point 111 and the bridge node 130 can be utilized for indicating the wireless signal quality of the wireless signal connection L1 shown in FIG. 4. The signal quality indicator corresponding to the wireless signal connection between the access point 111 and the controller node 140 can be utilized for indicating the wireless signal quality of the wireless signal connection L2 shown in FIG. 4. The signal quality indicator corresponding to the wireless signal connection between the access point 114 and the controller node 140 can be utilized for indicating the wireless signal quality of the wireless signal connection L3 shown in FIG. 4. Similarly, the signal quality indicator corresponding to the wireless signal connection between the access point 114 and the root node 120 can be utilized for indicating the wireless signal quality of the wireless signal connection L4 shown in FIG. 4.

In the operation 318, each of the plurality of access points 111-117 may transmit its neighboring node detection result to the controller node 140. The neighboring node detection result of a specific access point comprises the identification data (e.g., MAC address, hardware identification code, or the like) of each of the neighboring nodes of the specific access point. Additionally, the neighboring node detection result of the specific access point also comprises the signal measurement result in respect of each neighboring node of the specific access point. Each access point may directly transmit its neighboring node detection result to the controller node 140, or indirectly transmit its neighboring node detection result to the controller node 140 through the current wireless backhaul path.

In the operation 320, the third wireless communication circuit 241 of the controller node 140 may receive the neighboring node detection results directly or indirectly transmitted from the plurality of access points 111-117.

Based on the received neighboring node detection results, the third control circuit 245 may determine whether any access point becomes inaccessible to other nodes. If so, the third control circuit 245 may update the logical topology relationship of the wireless backhaul network 100 correspondingly.

In the operation 322, the third control circuit 245 may determine whether to change the current wireless backhaul path or not. Based on the signal measurement results contained in the received neighboring node detection results, the third control circuit 245 is enabled to obtain the signal quality indicator of each pair of neighboring nodes within the wireless backhaul network 100. Accordingly, the third control circuit 245 may calculate a path quality indicator for each of the possible wireless signal paths between the root node 120 and the bridge node 130.

It can be appreciated from the foregoing descriptions that each pair of neighboring nodes within the wireless backhaul network 100 is a segment of one or more possible wireless signal paths between the root node 120 and the bridge node 130. That is, the signal quality indicator of each pair of neighboring nodes indicates the signal quality of a segment of one or more possible wireless signal paths between the root node 120 and the bridge node 130. Accordingly, the third control circuit 245 may calculate the path quality indicator for a specific wireless signal path by performing an appropriate calculation on the signal quality indicators of respective segments of that specific wireless signal path.

For example, the third control circuit 245 may calculate the path quality indicator for the current wireless backhaul path formed by the four consecutive wireless signal connections L1, L2, L3, and L4 by performing an appropriate calculation on the signal quality indicators respectively corresponding to the wireless signal connections L1, L2, L3, and L4.

In one embodiment, the third control circuit 245 may utilize the sum or the average value of the above four signal quality indicators as the path quality indicator of the current wireless backhaul path formed by the four consecutive wireless signal connections L1, L2, L3, and L4. In this case, if current wireless backhaul path has a higher path quality indicator, it means that the overall wireless signal quality of the current wireless backhaul path is better.

In another embodiment, the third control circuit 245 may first calculate the sum or the average value of the above four signal quality indicators, and subtract the calculation result from a fixed value to obtain a residue. Then, the third control circuit 245 may utilize the residue as the path quality indicator of the current wireless backhaul path formed by the four consecutive wireless signal connections L1, L2, L3, and L4. In this case, if current wireless backhaul path has a lower path quality indicator, it means that the overall wireless signal quality of the current wireless backhaul path is better.

Similarly, for each of other possible wireless signal paths between the root node 120 and the bridge node 130, the third control circuit 245 may adopt the same approach described above to calculate a corresponding path quality indicator.

In the operation 322, the third control circuit 245 may compare the path quality indicator of the current wireless backhaul path with the path quality indicators of other possible wireless signal paths between the root node 120 and the bridge node 130 to determine whether to change the current wireless backhaul path.

In one embodiment, the third control circuit 245 may decide to change the current wireless backhaul path if there exists at least one possible wireless signal path whose path quality indicator is better than the path quality indicator of the current wireless backhaul path.

In another embodiment, the third control circuit 245 may decide change the current wireless backhaul path if there exists at least one possible wireless signal path whose path quality indicator is better than the path quality indicator of the current wireless backhaul path to a predetermined extent.

In yet another embodiment, the third control circuit 245 may decide to change the current wireless backhaul path only if the current wireless backhaul path has been employed over a predetermined time length and there exists at least one possible wireless signal path whose path quality indicator is better than the path quality indicator of the current wireless backhaul path.

In yet another embodiment, the third control circuit 245 may decide to change the current wireless backhaul path only if the current wireless backhaul path has been employed over a predetermined time length and there exists at least one possible wireless signal path whose path quality indicator is better than the path quality indicator of the current wireless backhaul path to a predetermined extent.

In order to avoid changing the wireless backhaul path of the wireless backhaul network 100 too frequently, the third control circuit 245 may configure a protection window for the duration of the current wireless backhaul path, and does not replace the current wireless backhaul path before the end of the protection window. For example, the third control circuit 245 may configure the first period P1 describe previously to be longer than a predetermined time length, so that the current wireless backhaul path will not be changed in the first period P1.

If the third control circuit 245 decides not to change the current wireless backhaul path, the third control circuit 245 may again perform the above operation 310 after a certain period of time. That is, the aforementioned operations 310, 312, 314, 316, 318, 320, and 322 may be intermittently repeated during the operations of the wireless backhaul network 100.

On the contrary, if the third control circuit 245 decides to change the current wireless backhaul path, the third control circuit 245 may perform the operation 324.

In the operation 324, the third control circuit 245 may select another set of access points located on a new replacement path that matches a predetermined condition as new backhaul nodes.

For example, the third control circuit 245 may select any possible wireless signal path having a path quality indicator better than that of the current wireless backhaul path as the new replacement path.

For another example, the third control circuit 245 may select a possible wireless signal path having the best path quality indicator from multiple possible wireless signal path whose path quality indicators are better than the current wireless backhaul path as the new replacement path.

For yet another example, the third control circuit 245 may select a possible wireless signal path having a path quality indicator better than that of the current wireless backhaul path to a predetermined extent as the new replacement path.

For yet another example, the third control circuit 245 may select a possible wireless signal path having a path quality indicator better than that of the current wireless backhaul path while passing through the controller node 140 as the new replacement path.

For yet another example, the third control circuit 245 may select a possible wireless signal path having a path quality indicator better than that of the current wireless backhaul path to a predetermined extent while passing through the controller node 140 as the new replacement path.

For yet another example, the third control circuit 245 may select a possible wireless signal path having a path quality indicator better than that of the current wireless backhaul path but does not pass through the controller node 140 as the new replacement path.

For yet another example, the third control circuit 245 may select a possible wireless signal path having a path quality indicator better than that of the current wireless backhaul path to a predetermined extent but does not pass through the controller node 140 as the new replacement path.

Then, the third control circuit 245 may again perform the operation 306 to utilize the third wireless communication circuit 241 to transmit a path configuration instruction to the selected access points on the new replacement path. Similarly, the path configuration instruction addressed to each selected access point on the new replacement path may provide the selected access point with the identification data (e.g., MAC address, hardware identification code, or the like) of the neighboring node to be connected by the selected access point.

Similarly, each of the selected access points on the new replacement path then perform the above operation 308 to automatically establishes wireless signal connections with two neighboring nodes on the new replacement path, and acts as a signal repeater between the two connected neighboring nodes. As a result, a new replacement wireless backhaul path between the root node 120 and the bridge node 130 can be formed, and the wireless backhaul network 100 will replaces the previous replacement wireless backhaul path with the new replacement wireless backhaul path.

As shown in FIG. 5, for example, supposing that the access points selected by the controller node 140 in the above operation 324 are the access point 113 and the access point 114, four consecutive wireless signal connections L5, L6, L3, and L4 may collectively constitute the new replacement wireless backhaul path between the root node 120 and the bridge node 130 in a second period P2 after the aforementioned first period P1. In the embodiment of FIG. 5, the controller node 140 is located on the new replacement wireless backhaul path.

Afterwards, the aforementioned operations 310, 312, 314, 316, 318, 320, and 322 may be intermittently repeated during the subsequent operations of the wireless backhaul network 100.

In practical applications, the controller node 140 may always select a possible wireless signal path passing through the controller node 140 as a replacement path, such as the case described in the previous embodiments of FIG. 4 and FIG. 5. As a result, the controller node 140 will be always located on the wireless backhaul path of the wireless backhaul network 100. In this situation, the controller node 140 is enabled to control the data transmission timings of the wireless backhaul path, and thus has greater control over the data rate or loading balancing of the wireless backhaul path.

Please note that the controller node 140 always selects a possible wireless signal path passing through the controller node 140 as a replacement path is merely an exemplary embodiment rather than a restriction to practical implementations. In practice, the controller node 140 may always select a possible wireless signal path that does not pass through the controller node 140 as a replacement path.

Figure 6:
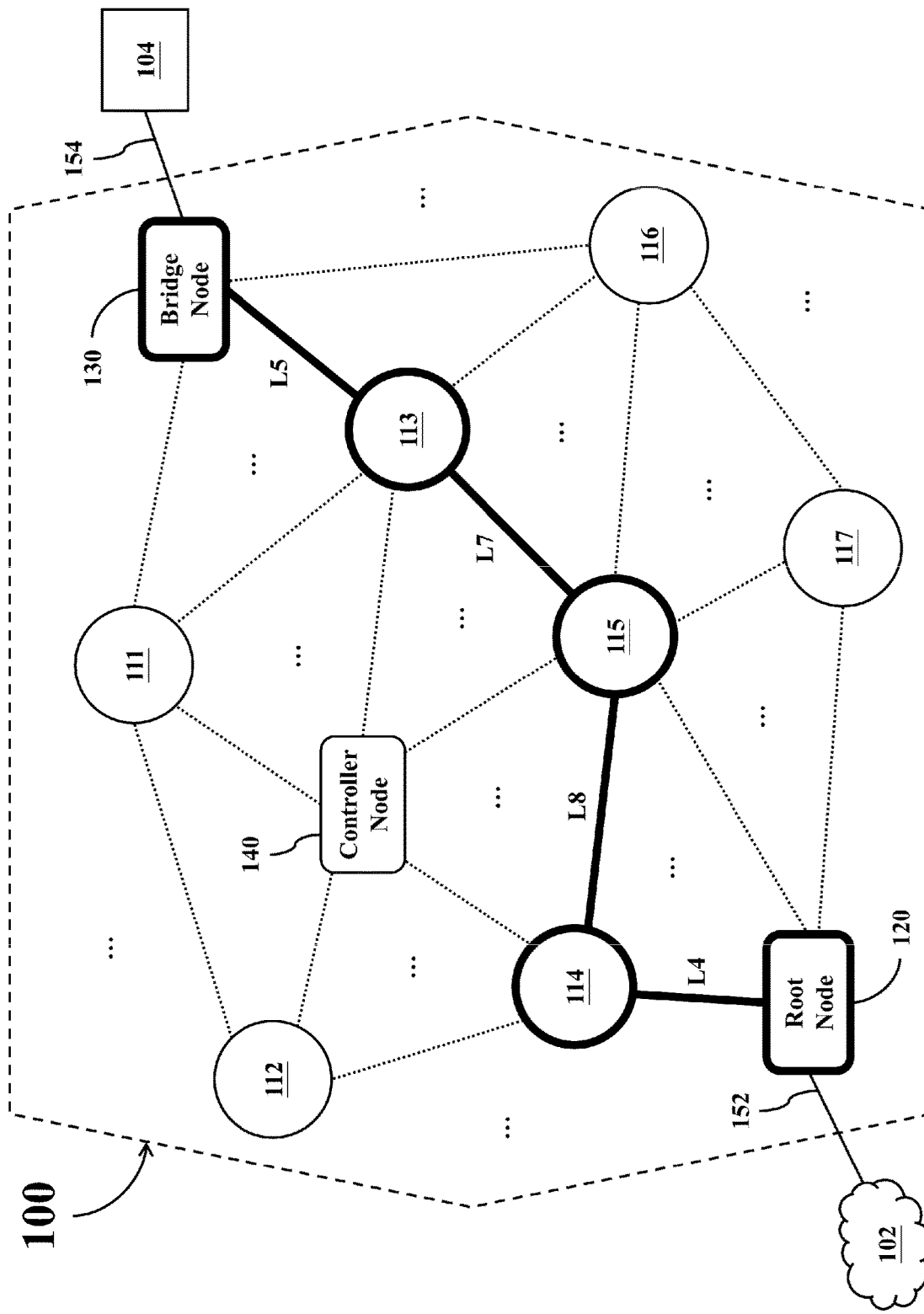
FIG. 6 and FIG. 7 show simplified schematic diagrams of wireless backhaul paths of the wireless backhaul network in different periods of time according to another embodiment of the present disclosure.
Figure 7:
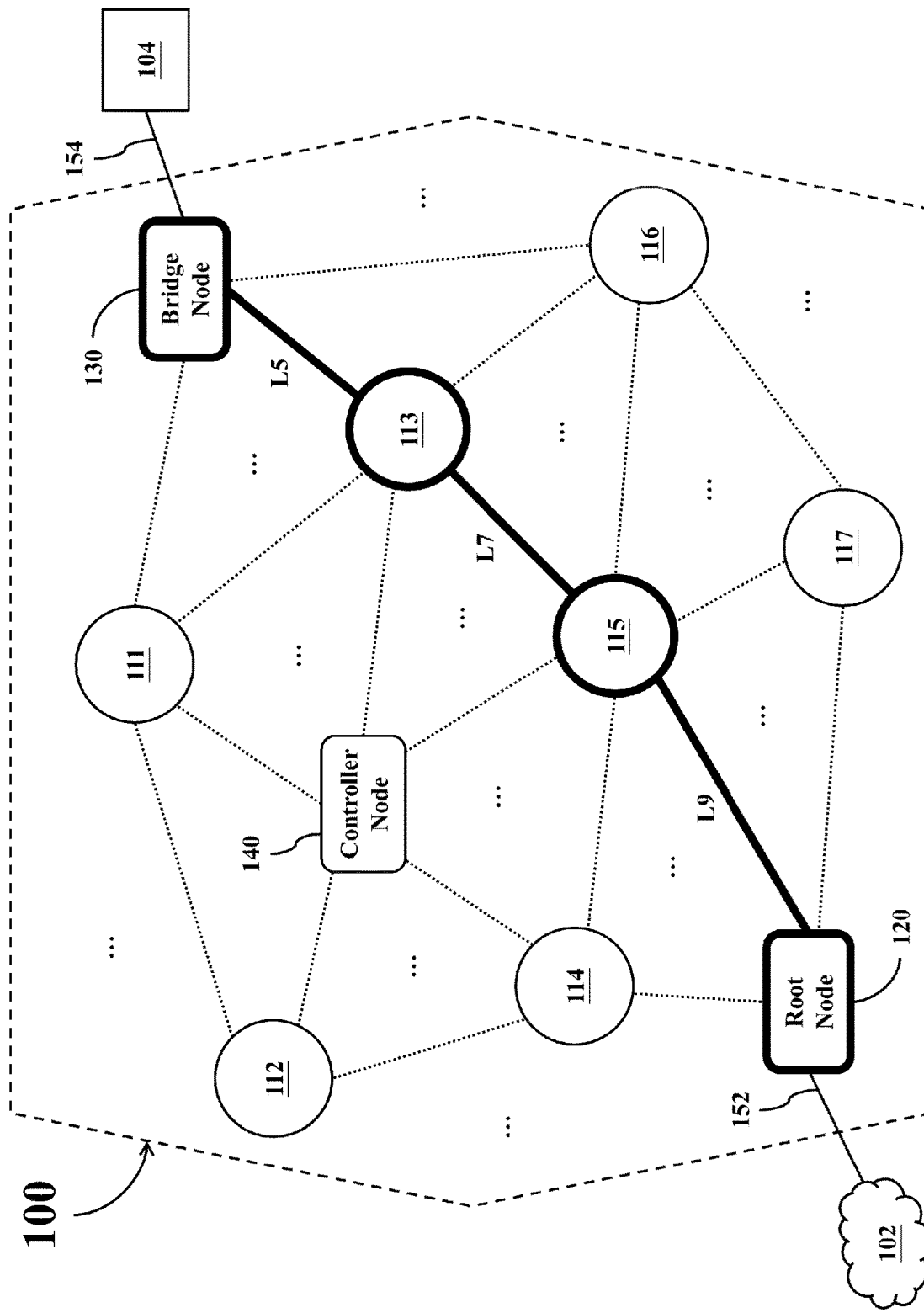

For example, FIG. 6 and FIG. 7 show simplified schematic diagrams of wireless backhaul paths of the wireless backhaul network 100 in different periods of time according to another embodiment of the present disclosure. In the embodiment of FIG. 6 and FIG. 7, the controller node 140 would always select a possible wireless signal path that does not pass through the controller node 140 as a replacement path.

As shown in FIG. 6, supposing that the access points selected by the controller node 140 in the above operation 304 are the access point 113, access point 114, and the access point 115. Four consecutive wireless signal connections L5, L7, L8, and L4 may collectively constitute a replacement wireless backhaul path between the root node 120 and the bridge node 130 in the aforementioned first period P1. In this case, the controller node 140 is not located on the replacement wireless backhaul path.

As shown in FIG. 7, supposing that the access points selected by the controller node 140 in the above operation 324 are the access point 113 and the access point 115, three consecutive wireless signal connections L5, L7, and L9 may collectively constitute the new replacement wireless backhaul path between the root node 120 and the bridge node 130 in the aforementioned second period P2. In this case, the controller node 140 is either located on the new replacement wireless backhaul path.

Since each selected replacement path does not pass through the controller node 140, the controller node 140 will be always located outside the wireless backhaul path of the wireless backhaul network 100. In this situation, the work load of the controller node 140 can be effectively reduced, thereby lowering the hardware requirement of the controller node 140.

In the previous embodiment, the root node 120, the bridge node 130, and the controller node 140 are separate nodes of the wireless backhaul network 100. But this is merely an exemplary example, rather than a restriction to the practical implementations.

Figure 8:
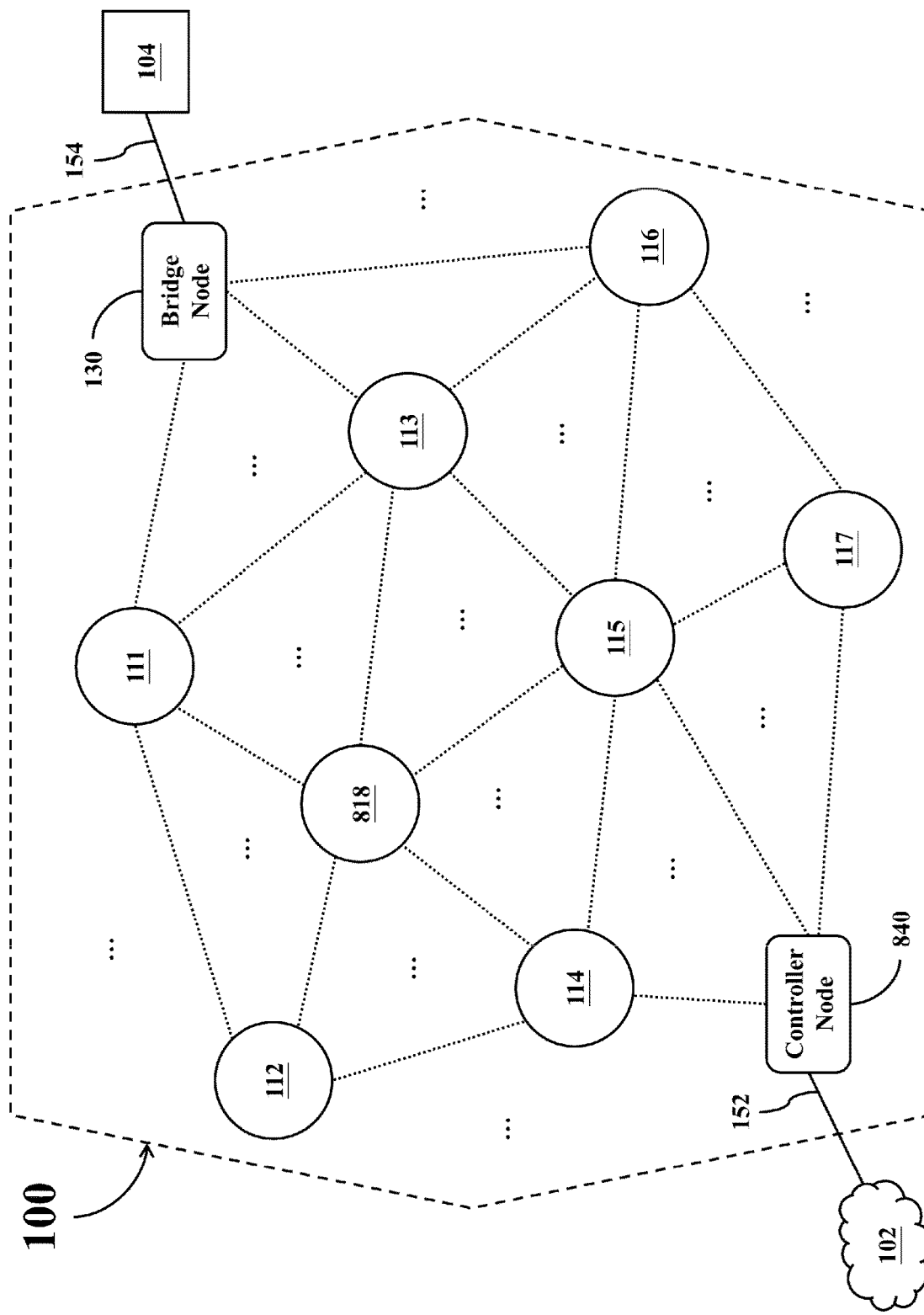
FIG. 8 shows a simplified functional block diagram of the wireless backhaul network according to a second embodiment of the present disclosure.
Figure 9:
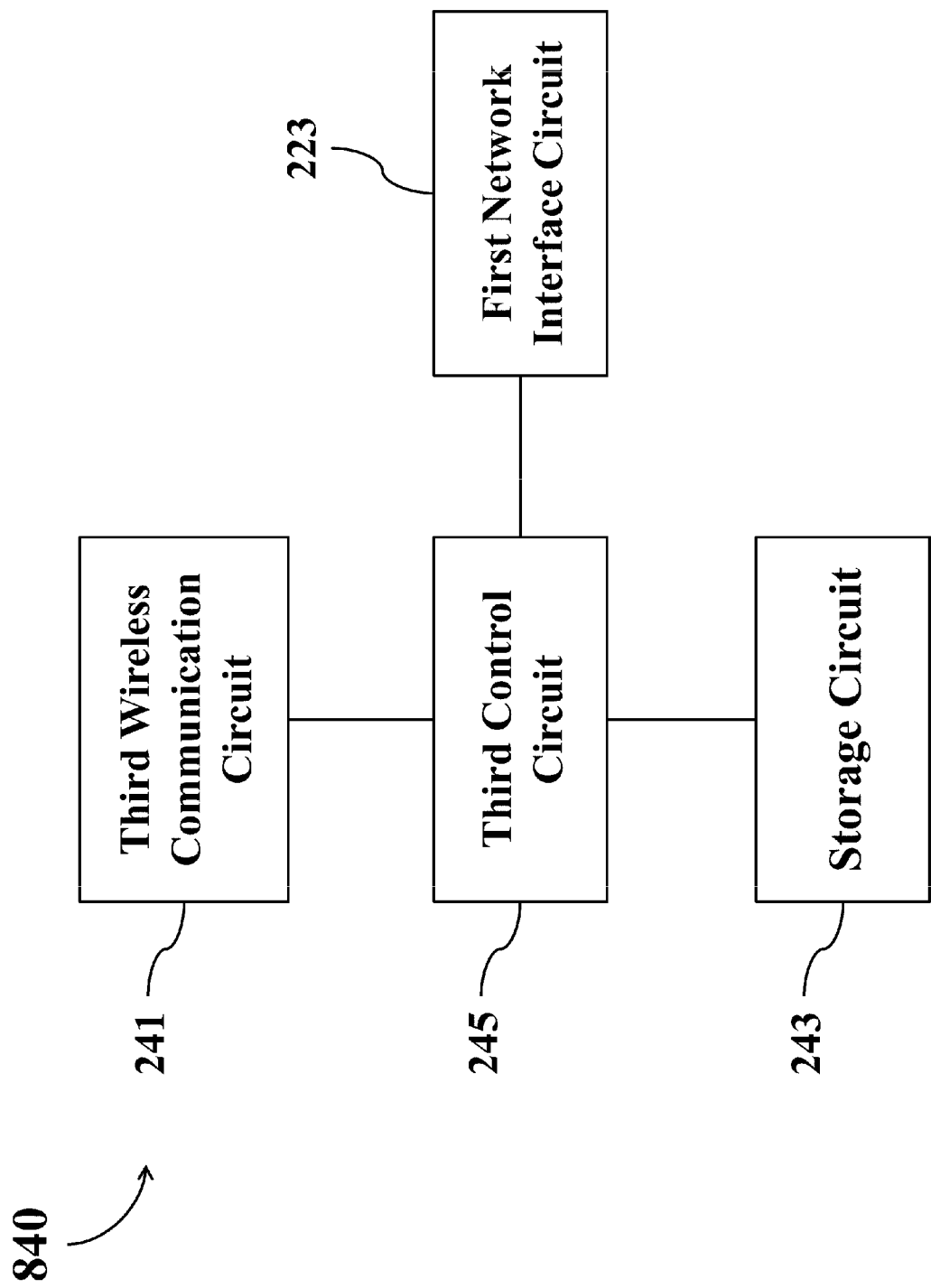
FIG. 9 shows a simplified functional block diagram of a controller node of the wireless backhaul network according to a second embodiment of the present disclosure.

For example, please refer to FIG. 8 and FIG. 9. FIG. 8 shows a simplified functional block diagram of the wireless backhaul network 100 according to a second embodiment of the present disclosure. FIG. 9 shows a simplified functional block diagram of a controller node 840 of the wireless backhaul network 100 according to a second embodiment of the present disclosure.

In the embodiment of FIG. 8, the root node 120 described previously is replaced with the controller node 840, the functionality of the aforementioned controller node 140 is integrated into the controller node 840, while the original place of the controller node 140 is replaced with an access point 818 in the wireless backhaul network 100.

As shown in FIG. 9, the controller node 840 comprises the third wireless communication circuit 241, the storage circuit 243, the first network interface circuit 223, and the third control circuit 245. In the embodiment of FIG. 9, the functionalities of the first wireless communication circuit 221 and the first control circuit 225 of the aforementioned root node 120 are respectively integrated into the third wireless communication circuit 241 and the third control circuit 245. Accordingly, the controller node 840 is capable of performing the operations of both the root node 120 and the controller node 140 described previously.

Figure 10:
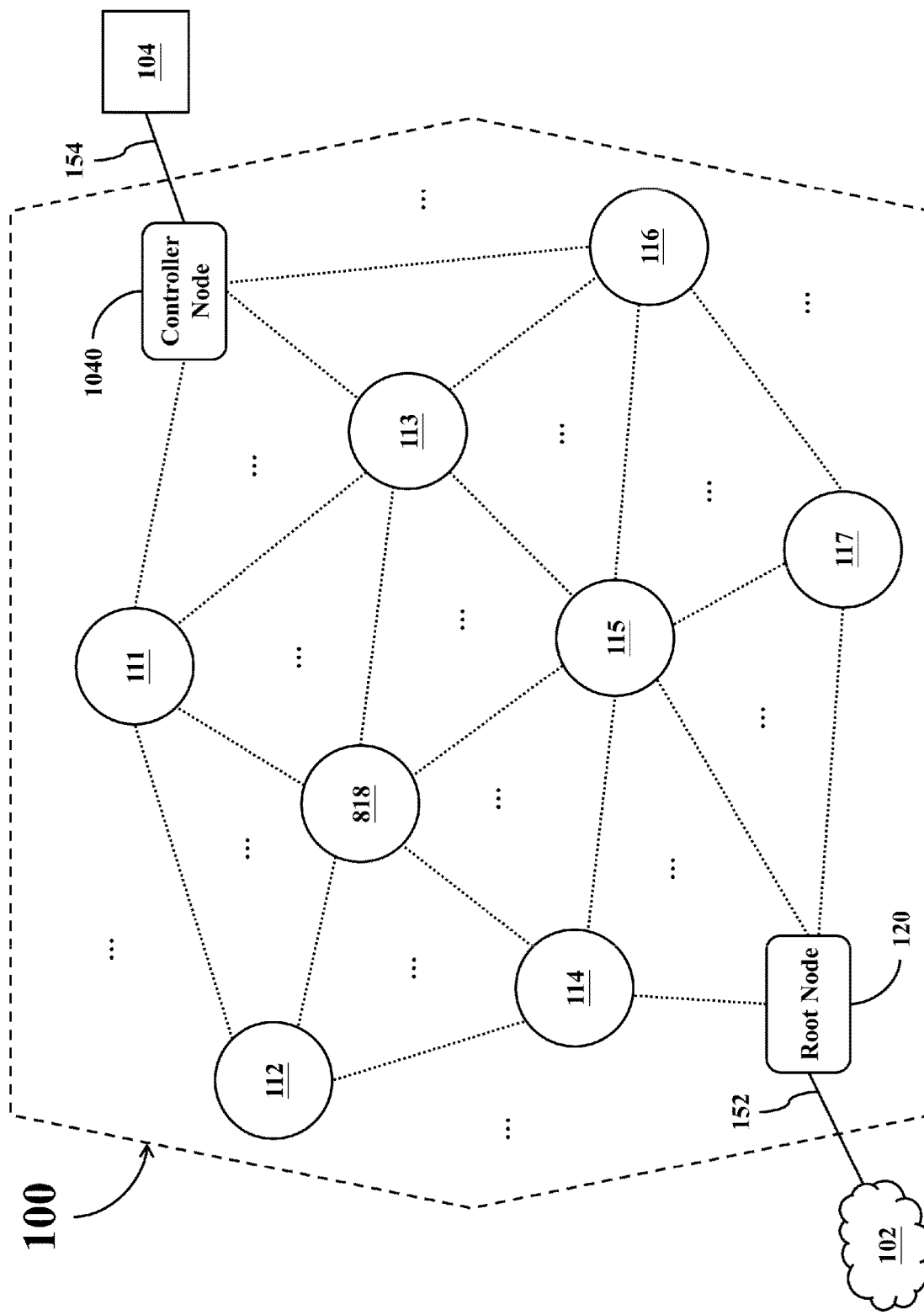
FIG. 10 shows a simplified functional block diagram of the wireless backhaul network according to a third embodiment of the present disclosure.
Figure 11:
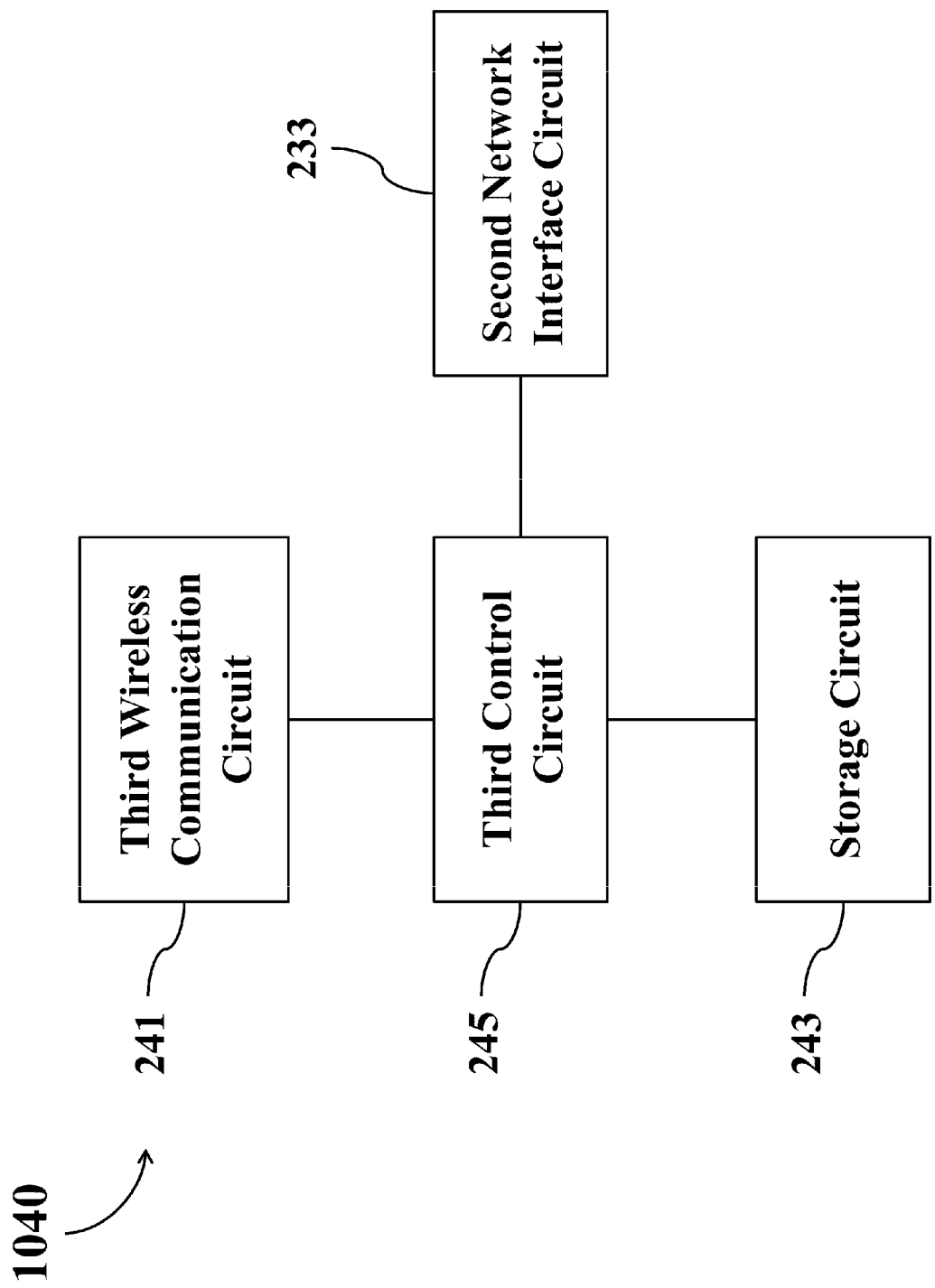
FIG. 11 shows a simplified functional block diagram of a controller node of the wireless backhaul network according to a third embodiment of the present disclosure.

Please refer to FIG. 10 and FIG. 11. FIG. 10 shows a simplified functional block diagram of the wireless backhaul network 100 according to a third embodiment of the present disclosure. FIG. 11 shows a simplified functional block diagram of a controller node 1040 of the wireless backhaul network 100 according to a third embodiment of the present disclosure.

In the embodiment of FIG. 10, the bridge node 130 described previously is replaced with the controller node 1040, the functionality of the aforementioned controller node 140 is integrated into the controller node 1040, while the original place of the controller node 140 is replaced with the access point 818 in the wireless backhaul network 100.

As shown in FIG. 11, the controller node 1040 comprises the third wireless communication circuit 241, the storage circuit 243, the second network interface circuit 233, and the third control circuit 245. In the embodiment of FIG. 11, the functionalities of the second wireless communication circuit 231 and the second control circuit 235 of the aforementioned bridge node 130 are respectively integrated into the third wireless communication circuit 241 and the third control circuit 245. Accordingly, the controller node 1040 is capable of performing the operations of both the bridge node 130 and the controller node 140 described previously.

The foregoing descriptions regarding the implementations, connections, operations, and related advantages of other corresponding functional blocks in the embodiments of FIG. 1 through FIG. 7 are also applicable to the embodiment of FIG. 8 and FIG. 10. For the sake of brevity, those descriptions will not be repeated here.

In some embodiments where the administrator/creator of the wireless backhaul network 100 inputs the actual topology information of the wireless backhaul network 100 into the controller node 140, 840, or 1040, the operation 302 of FIG. 3 described previously may be omitted.

It can be appreciated from the foregoing elaborations that the controller node 140, 840, or 1040 dynamically changes the wireless backhaul path of the wireless backhaul network 100 based on the neighboring node detection results transmitted from the access points 111-117, 818. Accordingly, even the wireless signal environment of the wireless backhaul network 100 changes with time, the controller node 140, 840, or 1040 can adaptively select an appropriate wireless backhaul path for the wireless backhaul network 100 by adopting the method of FIG. 3. As a result, it can effectively prevent the performance of the wireless backhaul network 100 from degrading significantly due to the change of wireless signal environment, thereby ensuring the overall performance of the wireless backhaul network 100.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A wireless backhaul network (100) for bridging a neighboring network (102) and a network device (104), comprising:
a plurality of access points (111-117, 818);
a root node (120), comprising:
a first wireless communication circuit (221), arranged to operably communicate with at least a portion of the plurality of access points (111-117, 818) through wireless transmission approaches;
a first network interface circuit (223), arranged to operably communicate with the neighboring network (102) through a first communication link (152); and
a first control circuit (225), coupled with the first wireless communication circuit (221) and the first network interface circuit (223), and arranged to operably control the first wireless communication circuit (221) and the first network interface circuit (223);
a bridge node (130), comprising:
a second wireless communication circuit (231), arranged to operably communicate with at least a portion of the plurality of access points (111-117, 818) through wireless transmission approaches;
a second network interface circuit (233), arranged to operably communicate with the network device (104) through a second communication link (154); and
a second control circuit (235), coupled with the second wireless communication circuit (231) and the second network interface circuit (233), and arranged to operably control the second wireless communication circuit (231) and the second network interface circuit (233); and
a controller node (140), comprising:
a third wireless communication circuit (241), arranged to operably communicate with the root node (120), the bridge node (130), and at least a portion of the plurality of access points (111-117, 818) through wireless transmission approaches; and
a third control circuit (245), coupled with the third wireless communication circuit (241) and arranged to operably select a first subset (111, 114; 113, 114, 115) of the plurality of access points (111-117, 818) as backhaul nodes to form a first wireless backhaul path (L1, L2, L3, L4; L5, L7, L8, L4) in a first period (P1);
wherein the third control circuit (245) is further arranged to dynamically select a different second subset (113, 114; 113, 115) of the plurality of access points (111-117, 818) as new backhaul nodes to form a second wireless backhaul path (L5, L6, L3, L4; L5, L7, L9) in a second period (P2), so as to replace the first wireless backhaul path (L1, L2, L3, L4; L5, L7, L8, L4);
wherein the third control circuit (245) is further arranged to operably configure a protection window for a duration of the first wireless backhaul path (L1, L2, L3, L4; L5, L7, L8, L4), and arranged to not replace the first wireless backhaul path (L1, L2, L3, L4; L5, L7, L8, L4) before the end of the protection window.

2. The wireless backhaul network (100) of claim 1, wherein the third control circuit (245) is further arranged to intermittently request each of the plurality of access points (111-117, 818) to detect neighboring nodes and measure wireless signal in respect of each neighboring node, and further arranged to operably determine whether to replace the first wireless backhaul path (L1, L2, L3, L4; L5, L7, L8, L4) formed in the first period (P1) according to neighboring node detection results and signal measurement results of the plurality of access points (111-117, 818).

3. The wireless backhaul network (100) of claim 2, wherein the controller node (140) is located on both the first wireless backhaul path (L1, L2, L3, L4) and the second wireless backhaul path (L5, L6, L3, L4).

4. The wireless backhaul network (100) of claim 2, wherein the controller node (140) is not located on the first wireless backhaul path (L5, L7, L8, L4) or the second wireless backhaul path (L5, L7, L9).

5. The wireless backhaul network (100) of claim 2, wherein the third control circuit (245) is further arranged to operably calculate a first path quality indicator for the first wireless backhaul path (L1, L2, L3, L4; L5, L7, L8, L4) and a second path quality indicator for the second wireless backhaul path (L5, L6, L3, L4; L5, L7, L9) according to the neighboring node detection results and the signal measurement results of the plurality of access points (111-117, 818);
wherein the third control circuit (245) replaces the first wireless backhaul path (L1, L2, L3, L4; L5, L7, L8, L4) with the second wireless backhaul path (L5, L6, L3, L4; L5, L7, L9) in the second period (P2) only if the second path quality indicator is better than the first path quality indicator to a predetermined extent.

6. A wireless backhaul network (100) for bridging a neighboring network (102) and a network device (104), comprising:
a plurality of access points (111-117, 818);
a controller node (840), comprising:
a third wireless communication circuit (241), arranged to operably communicate with at least a portion of the plurality of access points (111-117, 818) through wireless transmission approaches;
a first network interface circuit (223), arranged to operably communicate with the neighboring network (102) through a first communication link (152); and
a third control circuit (245), coupled with the third wireless communication circuit (241) and the first network interface circuit (223), and arranged to operably select a first subset (111, 114; 113, 114, 115) of the plurality of access points (111-117, 818) as backhaul nodes to form a first wireless backhaul path (L1, L2, L3, L4; L5, L7, L8, L4) in a first period (P1); and
a bridge node (130), comprising:
a second wireless communication circuit (231), arranged to operably communicate with at least a portion of the plurality of access points (111-117, 818) through wireless transmission approaches;
a second network interface circuit (233), arranged to operably communicate with the network device (104) through a second communication link (154); and
a second control circuit (235), coupled with the second wireless communication circuit (231) and the second network interface circuit (233), and arranged to operably control the second wireless communication circuit (231) and the second network interface circuit (233);
wherein the third control circuit (245) is further arranged to operably communicate with the bridge node (130), and to dynamically select a different second subset (113, 114; 113, 115) of the plurality of access points (111-117, 818) as new backhaul nodes to form a second wireless backhaul path (L5, L6, L3, L4; L5, L7, L9) in a second period (P2), so as to replace the first wireless backhaul path (L1, L2, L3, L4; L5, L7, L8, L4);
wherein the third control circuit (245) is further arranged to operably configure a protection window for a duration of the first wireless backhaul path (L1, L2, L3, L4; L5, L7, L8, L4), and arranged to not replace the first wireless backhaul path (L1, L2, L3, L4; L5, L7, L8, L4) before the end of the protection window.

7. The wireless backhaul network (100) of claim 6, wherein the third control circuit (245) is further arranged to intermittently request each of the plurality of access points (111-117, 818) to detect neighboring nodes and measure wireless signal in respect of each neighboring node, and further arranged to operably determine whether to replace the first wireless backhaul path (L1, L2, L3, L4; L5, L7, L8, L4) formed in the first period (P1) according to neighboring node detection results and signal measurement results of the plurality of access points (111-117, 818).

8. The wireless backhaul network (100) of claim 7, wherein the controller node (840) is located on both the first wireless backhaul path (L1, L2, L3, L4) and the second wireless backhaul path (L5, L6, L3, L4).

9. The wireless backhaul network (100) of claim 7, wherein the controller node (840) is not located on the first wireless backhaul path (L5, L7, L8, L4) or the second wireless backhaul path (L5, L7, L9).

10. The wireless backhaul network (100) of claim 7, wherein the third control circuit (245) is further arranged to operably calculate a first path quality indicator for the first wireless backhaul path (L1, L2, L3, L4; L5, L7, L8, L4) and a second path quality indicator for the second wireless backhaul path (L5, L6, L3, L4; L5, L7, L9) according to the neighboring node detection results and the signal measurement results of the plurality of access points (111-117, 818);
wherein the third control circuit (245) replaces the first wireless backhaul path (L1, L2, L3, L4; L5, L7, L8, L4) with the second wireless backhaul path (L5, L6, L3, L4; L5, L7, L9) in the second period (P2) only if the second path quality indicator is better than the first path quality indicator to a predetermined extent.

11. A wireless backhaul network (100) for bridging a neighboring network (102) and a network device (104), comprising:
a plurality of access points (111-117, 818);
a root node (120), comprising:
a first wireless communication circuit (221), arranged to operably communicate with at least a portion of the plurality of access points (111-117, 818) through wireless transmission approaches;
a first network interface circuit (223), arranged to operably communicate with the neighboring network (102) through a first communication link (152); and
a first control circuit (225), coupled with the first wireless communication circuit (221) and the first network interface circuit (223), and arranged to operably control the first wireless communication circuit (221) and the first network interface circuit (223); and
a controller node (1040), comprising:
a third wireless communication circuit (241), arranged to operably communicate with the root node (120) and at least a portion of the plurality of access points (111-117, 818) through wireless transmission approaches;
a second network interface circuit (233), arranged to operably communicate with the network device (104) through a second communication link (154); and
a third control circuit (245), coupled with the third wireless communication circuit (241) and the second network interface circuit (233), and arranged to operably select a first subset (111, 114; 113, 114, 115) of the plurality of access points (111-117, 818) as backhaul nodes to form a first wireless backhaul path (L1, L2, L3, L4; L5, L7, L8, L4) in a first period (P1);
wherein the third control circuit (245) is further arranged to dynamically select a different second subset (113, 114; 113, 115) of the plurality of access points (111-117, 818) as new backhaul nodes to form a second wireless backhaul path (L5, L6, L3, L4; L5, L7, L9) in a second period (P2), so as to replace the first wireless backhaul path (L1, L2, L3, L4; L5, L7, L8, L4);

wherein the third control circuit (245) is further arranged to operably configure a protection window for a duration of the first wireless backhaul path (L1, L2, L3, L4; L5, L7, L8, L4), and arranged to not replace the first wireless backhaul path (L1, L2, L3, L4; L5, L7, L8, L4) before the end of the protection window.

12. The wireless backhaul network (100) of claim 11, wherein the third control circuit (245) is further arranged to intermittently request each of the plurality of access points (111-117, 818) to detect neighboring nodes and measure wireless signal in respect of each neighboring node, and further arranged to operably determine whether to replace the first wireless backhaul path (L1, L2, L3, L4; L5, L7, L8, L4) formed in the first period (P1) according to neighboring node detection results and signal measurement results of the plurality of access points (111-117, 818).

13. The wireless backhaul network (100) of claim 12, wherein the controller node (1040) is located on both the first wireless backhaul path (L1, L2, L3, L4) and the second wireless backhaul path (L5, L6, L3, L4).

14. The wireless backhaul network (100) of claim 12, wherein the controller node (1040) is not located on the first wireless backhaul path (L5, L7, L8, L4) or the second wireless backhaul path (L5, L7, L9).

15. The wireless backhaul network (100) of claim 12, wherein the third control circuit (245) is further arranged to operably calculate a first path quality indicator for the first wireless backhaul path (L1, L2, L3, L4; L5, L7, L8, L4) and a second path quality indicator for the second wireless backhaul path (L5, L6, L3, L4; L5, L7, L9) according to the neighboring node detection results and the signal measurement results of the plurality of access points (111-117, 818);

wherein the third control circuit (245) replaces the first wireless backhaul path (L1, L2, L3, L4; L5, L7, L8, L4) with the second wireless backhaul path (L5, L6, L3, L4; L5, L7, L9) in the second period (P2) only if the second path quality indicator is better than the first path quality indicator to a predetermined extent.

* * * * *